United States Patent [19]

Kildahl et al.

[11] 4,313,850

[45] Feb. 2, 1982

[54] CATALYST FOR THE POLYMERIZATION OF ALPHA-OLEFINS

[75] Inventors: Nicholas K. Kildahl, Shrewsbury, Mass.; Peter Fotis, Highland, Ind.

[73] Assignee: Standard Oil Company (Indiana), Chicago, Ill.

[21] Appl. No.: 84,981

[22] Filed: Oct. 15, 1979

[51] Int. Cl.$^3$ ............................. C08F 4/64; C08F 4/68
[52] U.S. Cl. .............. 252/429 B; 252/429 C; 252/431 C
[58] Field of Search ............ 252/431 C, 429 C, 429 B

[56] References Cited

U.S. PATENT DOCUMENTS

| | | | |
|---|---|---|---|
| 3,658,722 | 4/1972 | Delbouille et al. | 252/429 C |
| 3,875,075 | 4/1975 | Boone et al. | 252/429 C X |
| 3,901,863 | 8/1975 | Berger et al. | 252/429 C X |
| 3,984,389 | 10/1976 | Delbouille et al. | 252/429 C X |
| 4,022,958 | 5/1977 | Matsuura et al. | 252/429 C X |
| 4,130,699 | 12/1978 | Hoff et al. | 526/67 |

FOREIGN PATENT DOCUMENTS 258984 1/1972 United Kingdom .
1321766 6/1973 United Kingdom .

*Primary Examiner*—Patrick Garvin
*Attorney, Agent, or Firm*—Stephen L. Hensley; William T. McClain; William H. Magidson

[57] ABSTRACT

Catalyst component comprising the reaction product of components comprising (1) at least one divalent metal halocarboxylate, (2) at least one oxygenated organic compound of a Group IVB or VB metal and (3) at least one organoaluminum component, provided that when (3) contains less than an effective amount of halogen such components further comprise (4) at least one halogenating agent other than a Group IVB—VIB metal halide. Also disclosed are catalysts comprising the above-described component and organometallic promoter and methods for preparation and use of the catalyst components and catalysts.

50 Claims, No Drawings

CATALYST FOR THE POLYMERIZATION OF ALPHA-OLEFINS

BACKGROUND OF THE INVENTION

This invention relates to the polymerization of alpha-olefins and more particularly to an improved catalyst for the polymerization of alpha-olefins and methods for the preparation and use thereof.

In the polymerization of alpha-olefins, it is desirable to employ catalysts having sufficiently high activities that useful products can be obtained without the need for separation of catalyst residues from the polymeric product. A number of catalysts generally comprising a promoter and a supported, transition metal-containing component have been proposed for this purpose. One such catalyst, disclosed in U.S. Pat. No. 3,875,075 (Boone et al.), comprises (A) an organoaluminum promoter and (B) a supported component prepared by reaction of (1a) a magnesium salt of a chlorine-substituted $C_{2-7}$ carboxylic acid such as magnesium trichloroacetate, or (1b) the reaction product of (1a) with an aluminum halide, with (2) a Group IVB or VB halide or haloester, preferably titanium tetrachloride, at about 25° to 200° C., preferably in an inert diluent. While such catalysts exhibit desirable activities and sufficiently high sensitivity to molecular weight control agents such as hydrogen to allow for preparation of a wide range of product grades, preparation of the (B) component is disadvantageous because a substantial excess of the Group IVB or VB component typically is required to attain catalyst components having suitable activities. See Boone et al. of Column 3 lines 29-39. Further, the reaction product of the chlorocarboxylate salt or chlorocarboxylate salt-aluminum halide reaction product with the halogenated Group IVB or VB compound contains not only Group IVB or VB compounds affixed to a magnesium-containing support, but also, loosely adhering Group IVB or VB compounds. The latter, if retained in the product during use in the polymerization of alpha-olefins, can have undesirable effects on polymer particle size and morphology. Accordingly, it is desirable to wash the reaction product with an appropriate solvent to remove loosely adhering Group IVB or VB compounds prior to polymerization use and the patentee so indicates at Column 3 lines 40-46. As can be appreciated washing of the reaction product is disadvantageous because it adds expense to the preparation.

It is an object of the present invention to provide a supported catalyst component and catalyst based thereon which avoid the aforesaid difficulties. A further object of the invention is to provide an improved alpha-olefin polymerization catalyst and methods for the preparation and use thereof. Other objects of the invention will be apparent to persons of skill in the art from the following description.

It has now been found that the foregoing objects can be attained according to the present invention wherein there is provided an improved, supported catalyst component comprising the reaction product of components comprising (1) at least one divalent metal halocarboxylate salt, (2) at least one oxygenated organic compound of a Group IVB or VB metal, (3) at least one organoaluminum component, and, when (3) contains less than an effective amount of halogen, (4) at least one halogenating agent other than a halogen-containing compound of a Group IVB—VIB metal. In addition, there is provided an improved catalyst comprising (A) a promoter and (B) the aforesaid supported component. In the polymerization of alpha-olefins, such catalysts exhibit sufficiently high activities as to eliminate the need for separation of catalyst residues from polyalpha-olefins produced in the presence thereof. Further, such polyalpha-olefins exhibit a useful range of molecular weights and the catalysts exhibit sufficient sensitivity to molecular weight control agents commonly used during polymerization to allow for tailoring of product molecular weights to various end uses. Advantageously, preparation of the invented components does not require the use of large excesses of Group IVB or VB component and there is no need to remove unreacted Group IVB or VB compounds from the reaction product as required by Boone et al. The invented catalysts are advantageous for the additional reason that a mixture of divalent metal halocarboxylate salt with oxygenated organic Group IVB or VB component can be dissolved in an inert liquid preparative medium to form a one-phase system and thereby facilitate subsequent preparative manipulations.

Other patents which disclose supported catalyst components which may be of interest with respect to the present invention are discussed hereinbelow.

U.S. Pat. No. 3,658,722 (Delbouille et al.) discloses supported catalyst components prepared from (1) a nonmetallic halogenating agent, (2) an oxygenated compound of a divalent metal, including "salts derived from monoor polycarboxylic acids" (Column 2 lines 60-65), and (3) a Group IVB—VIB halide, alkoxide, or alkoxyhalide. Such components can be reacted simultaneously or the halogenating agent and the oxygenated divalent metal compound can be reacted in a first step followed by reaction of the result with the Group IVB—VIB component. To like effect is British Pat. No. 1,321,766 (Solvay) although a broader range of halogenating agents is disclosed. The invented catalysts are disguishable from those of Delbouille and Solvay because neither patent discloses the use of halocarboxylate salts of divalent metals in preparation of supported catalyst components. Further, neither patent discloses the use of organoaluminum components during the preparation. Additionally, like the aforesaid Boone et al. patent, Delbouille and Solvay require treatment of the disclosed reaction products "to eliminate the transition metal compounds which have not been chemically bonded to the support . . . preferably . . . by washing with hexane or with any other volatile inert solvent." (Debouille et al. at Column 4 lines 24-28; also see Solvay at page 3 lines 87-97.)

U.S. Pat. No. 3,901,863 (Berger et al.) discloses supported catalyst components prepared from (1) oxygenated organic transition metal compounds including titanium alkoxides, phenates, and enolates, (2) oxygenated organic compounds of divalent metals, including salts of carboxylic acids, and (3) organoaluminum halides of the formula $AlR_nR'_{3-n}$ wherein R is a hydrocarbyl radical of 1 to 20 carbon atoms, R' is halogen, and $0 \leq n \leq 3$. The disclosed catalyst components preferably are prepared by simultaneous reaction of the components or by reaction of the organoaluminun halide component with a mixture of the oxygenated organic components or by reaction of the oxygenated organic divalent metal compound with a mixture of the transition metal compound and the organoaluminum halide. Column 5 lines 1-19. Although Berger et al.'s oxygenated organic divalent metal compounds include carboxylate salts, halocarboxylate salts are not disclosed.

U.S. Pat. No. 3,984,389 (Delbouille et al.) discloses supported catalyst components prepared by reaction of divalent metal salts of hydrated, hydrous, or water-containing carboxylic acids and halogen-containing compounds of the Group IVB—VIB metals followed by washing of the result. The use of halocarboxylate salts of divalent metals, oxygenated organic compounds of the Group IVB and VB metals, organoaluminum components and halogenating agents according to the present invention is not disclosed.

British Pat. No. 1,258,984 (Hoechst) discloses supported catalyst components prepared from magnesium carboxylates and halogen-containing titanium compounds. However, halocarboxylate salts are expressly excluded at page 3, line 121 and the patentee fails to disclose the use of the Group IVB and VB and organoaluminum components employed in preparation of the invented catalyst components.

DESCRIPTION OF THE INVENTION

Briefly, the supported catalyst components of this invention comprise the reaction product of components comprising (1) at least one divalent metal halocarboxylate, (2) at least one oxygenated organic compound of a Group IVB or VB metal, (3) at least one organoaluminum component, and, when (3) contains less than an effective amount of halogen, (4) at least one halogenating agent other than a Group IVB—VIB metal halide. The preparative reaction is conducted neat or in the presence of an inert diluent and in the substantial absence of extraneous catalyst poisons at temperatures ranging from about 0° to about 200° C. The resulting component is combined with an organoaluminum promoter to form a catalyst for the polymerization of alpha-olefins. Optionally, the supported component is contacted with at least one agent capable of temporarily and reversibly deactivating such component prior to combination with the promoter.

In greater detail, the divalent metal halocarboxylates (1) employed according to the present invention are materials containing the structure

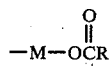

wherein M is a divalent Group IIA, IIB, IVA, VIB, VIIB or VIII metal and R is a halogen-containing organic group. Examples of divalent metals M include magnesium, calcium, barium, zinc, cadmium, tin, lead, manganese and iron. Manganese and manganous halocarboxylates are preferred from the standpoint of catalytic activity. Suitable halogen-containing organic groups include both mono- and polyhalogenated aliphatic and aromatic groups. Preferred haloorganic groups are the chlorinated and/or brominated alkyls of 1 to about 20 carbons and aryls, alkaryls, and aralkyls of 6 to about 20 carbons. Mixtures of different metal halocarboxylate salts can be employed if desired.

Divalent metal halocarboxylate salts which are preferred according to this invention are those wherein both groups bonded to M are identical halocarboxylate groups. However, it also is contemplated to employ halocarboxylate salts containing other suitable groups such as a different halocarboxylate group, halide, alkyl, aryl, alkoxy, aryloxy, carboxylate, hydroxyl, sulfate, phosphate, nitrate, carbonate, amino, or phosphorus acid ester bonded to metal.

Specific examples of divalent metal halocarboxylate salts include magnesium bis(monochloroacetate), manganous bis(monochloroacetate), calcium bis(monochloroacetate), cadmium bis(monochloroacetate), magnesium bis(dichloroacetate), magnesium bis(trichloroacetate), calcium bis(trichloroacetate), cadmium bis(trichloroacetate), magnesium bis(alpha-bromopropionate), barium bis(alpha-dibromopropionate), barium bis(beta-dichloroacrylate), barium bis(beta-dibromoacrylate), zinc bis(beta-dichloroacrylate), calcium bis(beta-dibromoacrylate), calcium bis(trichlorobutyrate), lead bis(trichlorobutyrate), calcium bis(3,5-dibromobenzoate), calcium bis(2,4-dimethyl-5-bromobenzoate), barium bis(monochlorobenzoate), barium bis(3,4-dibromobenzoate), barium bis(2,4-dichlorobenzoate), barium bis(2,5-dichlorobenzoate), barium bis(2,4-dimethyl-5-bromobenzoate), barium bis(3,5-dimethyl-4-bromobenzoate), calcium bis(monobromopsuedocumolcarboxylate), barium bis(monobromopsuedocumolcarboxylate), and lead bis(monobromopsuedocumolcarboxylate).

The above-described divalent metal halocarboxylate salts are known compounds and can be prepared by known methods such as by reaction of divalent metals with halocarboxylic acids or by refluxing divalent metal oxides, hydroxides or carbonates with halocarboxylic acids. Water is generated as a by-product of the latter reactions and, in many instances, the divalent metal halocarboxylate salts are obtained in hydrated form. Water, if present in sufficiently high amounts, can adversely affect performance of the inverted catalysts, and accordingly, it is desirable to dry the divalent metal halocarboxylate salts prior to use according to this invention. Drying is conveniently accomplished by heating or through the use of suitable drying agents.

From the standpoint of preparative ease, divalent metal halocarboxylates which are preferred according to this invention are salts of $C_{2-8}$ alkanoic acids and benzoic acid having at least one halogen atom, preferably chlorine or bromine, alpha to the carbonyl carbon due to the reactivity of such acids. Halocarboxylic acids having 2 or 3 halogen atoms alpha to the carbonyl carbon are even more reactive, and accordingly, salts thereof are more preferred from the standpoint of preparative ease. Catalytic activity is maximized through the use of magnesium and manganous salts of such acids and especially those of magnesium. Best results are attained through the use of magnesium trichloroacetate.

Oxygenated organic Group IVB and VB components (2) employed according to this invention include compounds of the formula $M^1(OR^1)_m$ or $O=M^1(OR^1)_{m-2}$ wherein $M^1$ is a Group IVB or VB metal such as titanium, zirconium or vanadium, each $R^1$ is independently an organic radical, preferably one containing 1 to about 20 carbons, and m corresponds to the valence of $M'$. Mixtures also can be employed. Specific examples of such compounds include alkoxides such as tetramethyl titanate, tetrabutyl titanate, tetrahexyl titanate, tetraisopropyl vanadate, and tetrabutyl zirconate; phenates such as tetraphenyl titanate; oxoalkoxides such as triisopropyl oxovanadate and trihexyl oxovanadate; and enolates such as titanium tetraacetylacetonate. Certain of these compounds are commerically available in the form of complexes with alcohols. An example is $Zr(OC_4H_9)_4 \cdot (C_4H_9OH)$. For purposes hereof, the aforesaid formulae and examples are intended to include such complexes.

From the standpoint of catalytic activity as well as availability and ease of use, the preferred oxygenated organic compounds of Group IVB or VB metals are the titanium(IV), zirconium(IV) and vanadium(III), (IV) and (V) alkoxides and oxoalkoxides containing 1 to about 6 carbon atoms per alkoxy group. The titanium(IV) $C_{1-6}$ alkoxides, and particularly tetrabutyl titanate are most preferred from the standpoint of catalytic activity and are particularly well suited for the production of polyalpha-olefins having molecular weight distributions suitable for injection molding applications. Use of combinations of titanium(IV) alkoxides with zirconium(IV) or vanadium(III-V) alkoxides or oxoalkoxides typically results in catalysts of somewhat lower activity than those based on titanium alone but polyalpha-olefin molecular weight distributions typically are broadened such that the polymers are well suited for film and bottle applications. The most preferred combination of Group IVB and VB components is a combination of tetrabutyl titanate and tetrabutyl zirconate.

Organoaluminum components (3) employing according to the present invention are materials of the formula $AlR^2_n X_{3-n}$ wherein each $R^2$ is independently a hydrocarbyl radical, e.g. alkyl, alkenyl, aryl, alkaryl, aralkyl, X is halogen and $0 < n \leq 3$. Mixtures also can be employed if desired. Preferred organoaluminums are those wherein $0 < n < 3$ because these contain halogen and thereby reduce or eliminate the need to use halogenating agent to ensure the availability of sufficient halogen during preparation of catalyst components. More preferred from the standpoint of availability, preparative ease and catalytic performance are those organoaluminum components wherein each $R^2$ in the formula is independently a hydrocarbyl radical of 1 to about 20 carbon atoms, X is chlorine or bromine and $0 < n < 3$. Most preferably, each $R^2$ is independently a straight chain, branched or cyclic alkyl radical of 1 to about 8 carbon atoms, X is chlorine and $0.5 \leq n \leq 2$ as these materials give best results in terms of catalytic performance and typically eliminate the need to use halogenating agent. Specific examples of such organoaluminum components include dimethyl-, diethyl-, diisobutyl-, di-n-hexyl- and diisooctyl- aluminum chloride, methyl-, ethyl-, isobutyl-, n-hexyl-, and isooctylaluminum sesquichlorides and dichlorides. Alkylaluminum dichlorides containing 1 to about 8 carbon atoms per alkyl group, and especially ethylaluminum dichloride, give best results.

The fourth component employed in preparation of the invented catalyst components is a halogenating agent other than a Group IVB—VIB metal halide. By halogenating agent is meant a rective halogen-containing material which, under the conditions employed in preparation of the invented catalyst components, is capable of reacting with the divalent metal and Group IVB or VB components to form halides of such metals. Such materials include molecular halogens, hydrogen halides, halogenated organic compounds containing reactive halogen, nonmetallic halides and oxyhalides and metallic halides. As used herein, the term metallic halides excludes halogen-containing compounds of the Group IVB—VIB metals. Specific examples of useful halogenating agents include molecular chlorine and bromine, hydrogen chloride, hydrogen bromide, hydrogen iodide, trichloromethane, carbon tetrachloride, phosphorus trichloride, phosphorus pentachloride, phosphorus oxytrichloride, thionyl chloride, nitrosyl chloride, carbonyl chloride, ammonium chloride, aluminum chloride, aluminum bromide, antimony pentachloride, silicon tetrachloride, germanium tetrachloride and tin tetrachloride. Mixtures also can be employed if desired. Halogenating agents which are preferred from the standpoint of catalyst performance are the chlorinating agents. Best results are attained with aluminum chloride.

As discussed in greater detail hereinbelow, the above-described halogenating agents must be employed when the organoaluminum component to be employed provides less than an effective amount of halogen. For example, when a halogen-free organoaluminum compound is employed or an organoaluminum halide is used in an amount that provides insufficient halogen, at least one halogenating agent is employed. Of course, even when an organoaluminum halide is employed in an amount effective to provide sufficient halogen, halogenating agent can be used if desired, however, this is not preferred because it adds time and cost to the preparation.

In preparation of the invented catalyst components, the divalent metal halocarboxylate and oxygenated organic Group IVB or VB metal component are employed in amounts such that the atomic ratio of metal contained in the oxygenated organic Group IVB or VB component to metal in the divalent metal halocarboxylate ranges from about 0.05:1 to about 20:1. To ensure that the catalyst components contain sufficient Group IVB or VB metal as to exhibit desirable activities while avoiding waste of the Group IVB or VB starting material, atomic ratios of about 0.1:1 to about 10:1 are preferred. Best results are attained at ratios of about 0.1:1 to about 3:1. The organoaluminum component is employed in an amount such that the atomic ratio of aluminum to metal in the Group IVB or VB metal component ranges from about 5:1 to about 50:1 with the proviso that when the organoaluminum component contains less than an amount of halogen which is effective to halide the metal in the divalent metal halocarboxylate and Group IVB or VB components, at least one halogenating agent is employed in an amount such that the organoaluminum component and halogenating agent provide at least an effective amount of halogen. The organoaluminum component contains less than an effective amount of halogen when the atomic ratio of (A) halogen provided by such component to (B) the sum of (1) two times the divalent metal in the divalent metal halocarboxylate component plus (2) m times the Group IVB and/or VB metal in the Group IVB or VB component is less than about 1:1. As used herein, m corresponds to the valence of the Group IVB or VB metal and it is to be understood that when the Group IVB or VB metal component employed is a combination of materials containing metals of different valences, (2) will be the sum of the products of the respective m values and the metal in the respective oxygenated organic Group IVB or VB metal components. An effective amount of halogen is an amount which satisfies the relation $$([X]_a + [X]_b)/(2[M] + m[M']) \geq 1,$$

wherein $[X]_a$ represents halogen in the organoaluminum component;

$[X]_b$ represents halogen in the halogenating agent;

[M] represents divalent metal in the divalent metal halocarboxylate component;

[M'] represents Group IVB or VB metal in the Group IVB or VB metal component; and m represents the valence of the Group IVB or VB metal in the Group IVB or VB metal component.

Again, if the Group IVB or VB metal component contains metals of different valences, m[M'] in the formula will be the sum of the products of the respective m and [M'] values. Also as noted hereinabove, even if the organoaluminum component contains an effective amount of halogen, i.e., $[X]_a \geq 2[M] + m[M']$, it is contemplated to use at least one halogenating agent although this is not preferred.

As can be seen from the foregoing formula, a minimum halogen to metal atomic ratio $(([X]_a + [X]_b)/(2[M] + m[M']))$ of about 1:1 is required. The maximum is not critical from the standpoint of catalyst performance. However, as a practical matter, there is no need to exceed ratios of about 20:1 and it is preferred to employ organoaluminum component or organoaluminum component and halogenating agent accordingly. More preferably, halogen to metal atomic ratios range from about 1.1:1 to about 10:1.

Preferred ratios of aluminum in the organoaluminum component to metal in the Group IVB or VB component range from about 8:1 to about 20:1 in order to ensure adequate reaction of the components without excess reduction of Group IVB or VB metal.

The sequence in which the above-described components are brought into contact is not critical except that the divalent metal halocarboxylate must be present during contacting of the oxygenated organic Group IVB or VB metal component with the organoaluminum component. Further, halogenating agent, when required, is added prior to reaction of Group IVB or VB metal component with organoaluminum component. Suitable sequences include the following:

(1) Reaction of divalent metal halocarboxylate with oxygenated organic Group IVB or VB metal component followed by reaction of the result with organoaluminum component;

(2) Reaction of divalent metal halocarboxylate with oxygenated organic Group IVB or VB component followed by reaction of the result with halogenating agent followed by reaction of the result with organoaluminum component;

(3) Simultaneous reaction of divalent metal halocarboxylate with Group IVB or VB metal component and organoaluminum component;

(4) Reaction of divalent metal halocarboxylate with halogenating agent followed by reaction of the result with Group IVB or VB metal component followed by reaction of the result with organoaluminum component.

Among the foregoing, (1) is most preferred as the mixture of divalent metal halocarboxylate salt and oxygenated organic Group IVB or VB metal component can be dissolved in an inert liquid preparative medium to form a one-phase system and thereby facilitate subsequent manipulations.

Irrespective of sequence, the preparation is conducted at temperatures ranging from about 0° to about 200° C. In steps involving reaction of organoaluminum component with oxygenated organic Group IVB or VB metal component, temperatures of about 0° to about 85° C. are preferred in order to avoid undesirably rapid reaction and generation of excessive heat during the reaction. In steps involving reaction of divalent metal halocarboxylate with oxygenated organic Group IVB or VB metal component in the absence of organoaluminum component, preferred temperatures range from about 80° to about 160° C. in order to ensure reasonable reaction rates and facilitate dissolution of the components when a diluent is employed. In the preferred preparative sequence (1), best results are attained by contacting the metal halocarboxylate and Group IVB or VB metal components at about 100° to about 140° C. and then contacting the result with the remaining components at about 0° to about 65° C.

The time of the preparation is not critical and can range from several minutes to several hours. Preferably the preparation is completed in about 1 to about 30 hours. In steps involving contact between organoaluminum component and Group IVB or VB metal component, it is desirable to combine the components gradually, e.g., by dropwise addition of the organoaluminum component, to avoid unduly rapid reaction. Preferably, such components are combined over a period of ½ to about 10 hours and allowed to react for about 1 to about 20 hours thereafter. In the preferred preparative sequence, best results are attained by reacting the metal halocarboxylate and Group IVB or VB metal components for about ¼ to about 5 hours, adding the organoaluminum component over about 1 to about 5 hours, and allowing the result to react for about 2 to about 20 hours. Irrespective of sequence, it is desirable to agitate the components over all or at least a portion of the reaction time to ensure adequate contact between components.

Preparation of the invented catalyst components can be conducted neat, however, it is preferred to employ an inert liquid as a diluent. Suitable diluents include a variety of hydrocarbons and halogenated hydrocarbons in which one or more of the preparative components is soluble and which are liquid at the reaction temperatures. Preferred diluents are the alkanes such as hexane, heptane, octane, nonane and decane although a variety of other materials including cycloalkanes such as cyclohexane, aromatics such as benzene and ethylbenzene and halogenated and hydrogenated aromatics such as chlorobenzene, o-dichlorobenzene, tetrahydronaphthalene and decahydronaphthalene also can be employed. Prior to use, it is desirable to purify any diluent to be employed, for example by percolation through silica gel and/or molecular sieves to remove traces of water, oxygen, polar compounds and other materials capable of adversely affecting catalyst activity.

The preparative reaction is conducted in the substantial absence of water, oxygen and other extraneous catalyst poisons. Conveniently, such materials are excluded by carrying out the preparation under an atmosphere of nitrogen, argon, or other inert gas. Drying of metal halocarboxylates also is helpful in this regard.

As a result of the above-described preparation there is obtained a solid reaction product useful as a catalyst component. If preparation is conducted in the presence of a diluent, the solid catalyst component can be separated therefrom, e.g., by filtration, decantation, if desired. For polymerization use, either the solid or a suspension thereof in the preparative diluent or fresh diluent can be employed. Although the chemical structure of the supported catalyst component is not presently known, the same comprises reduced Group IVB or VB metal halides and aluminum compounds affixed and/or intimately associated with a divalent metal halide-containing support.

In addition to the above-described supported component, the invented catalysts comprise a second component which is a promoter. Active catalyst is formed by combining the supported component and the promoter under conditions which substantially exclude extraneous catalyst poisons. Such poisons are conveniently excluded by combining the components in the presence of an inert gas such as nitrogen or argon. If desired, the components also can be combined in the presence of alpha-olefin monomer, preferably ethylene.

Promoters useful according to this invention include any of the materials commonly employed as cocatalysts or promoters for alpha-olefin polymerization catalyst components containing compounds of the Group IVB—VIB metals. Examples of such promoters include Group IA, IIA, IIB, IIIA and IVA organometallics containing at least one hydrocarbyl group bonded to metal. Preferred promoters are the metal alkyls, alkylhydrides and alkylhalides, such as alkyllithium compounds, dialkylzinc compounds, trialkylboron compounds, trialkylaluminum compounds, alkylaluminum halides and hydrides. Mixtures can also be employed. Specific examples of useful promoters include n-butyllithium, diethylzinc, di-n-propylzinc, triethylboron, triethylaluminum, triisobutylaluminum, tri-n-hexylaluminum, ethylaluminum dichloride, dibromide, and dihydride, isobutylaluminum dichloride, dibromide, and dihydride, diethylaluminum chloride, bromide, and hydride, di-n-propylaluminum chloride, bromide, and hydride, and diisobutylaluminum chloride, bromide and hydride. Promoters which are preferred for use according to this invention are the Group IIIA metal alkyls and dialkylhydrides having 1 to about 20 carbon atoms per alkyl radical. More preferably, the promoter is a trialkylaluminum compound having 1 to about 6 carbon atoms per alkyl radical such as trimethyl-, triethyl-, tri-n-propyl, triisobutyl-, tri-n-pentyl-, and tri-n-hexylaluminum. Most preferably, the promoter is triethylaluminum.

The promoter is employed in an amount which is at least effective to promote the polymerization activity of the supported component. Preferably, at least about 1 part by weight of promoter is employed per part by weight of solid component, although higher ratios, such as 10:1, 25:1, 100:1 or higher also are suitable and often given highly beneficial results, particularly when a portion of the promoter is employed to pretreat the polymerization medium used in solution type processes.

Prior to combining the supported catalyst components of this invention with a promoter, it also is contemplated to temporarily and reversibly deactivate the components by contacting the same with a suitable deactivating agent. In this manner, the invented supported catalyst components, which exhibit some polymerization activity even in the absence of a promoter, can be employed, without plugging of catalyst feed lines or inlet ports, in polymerization systems wherein catalyst components are conveyed to a polymerization zone in a stream containing polymerizable alpha-olefin or wherein the component otherwise contacts polymerizable monomer prior to entry into the polymerization zone. Once inside the polymerization zone, the temporary deactivation can be undone and activity promoted by contacting the catalyst components with promoter. Suitable deactivating agents, methods for using the same, and a method for introducing temporarily and reversibly deactivated catalyst component into a polymerization zone are disclosed in commonly assigned U.S. Pat. No. 4,130,699 (Hoff et al.) which is incorporated herein by reference. Deactivating agents which are preferred for use with the supported catalyst components of this invention are hydrogen halides and lower aliphatic alcohols, with anhydrous hydrogen chloride and ethanol being most preferred.

According to the invention, the above-described catalysts are employed in alpha-olefin polymerization processes wherein at least one polymerizable alpha-olefin is contacted with the catalyst under polymerizing conditions. Solution, bulk, and gas phase processes are contemplated herein.

Alpha-olefins which can be polymerized in the presence of the invented catalysts include ethylene, propylene, butene-1, pentene-1, 4-methylpentene-1, hexene-1, and mixtures thereof. Preferably, the invented catalysts are employed in the polymerization of ethylene or mixtures of ethylene with up to about 20 mole percent of a higher alpha-olefin.

The conditions under which the invented catalysts are employed in the polymerization of alpha-olefins are referred to herein as "polymerizing conditions" and include catalyst concentration, polymerization temperature and time, monomer pressure, the use of diluents in solution processes, exclusion of catalyst poisons, the use of agents to regulate polymer molecular weights, and other conditions well known to persons of skill in the art. The following description of polymerizing conditions is intended to furnish guidance as to the use of the invented catalysts and is not to be construed as limiting the scope of the invention.

The amount of supported component employed in polymerization is a catalytically effective amount and varies depending on a number of factors, such as choice of polymerization technique, reactor size and configuration, and choice of monomer. The amount can be determined by persons of skill in the art from the examples appearing hereinbelow. As noted hereinabove, promoter is used in at least an amount which is effective to promote the activity of the supported component.

Polymerization temperatures vary depending upon the type of process employed. In solution processes, wherein a solution of molten polyalpha-olefin in an inert polymerization medium is formed, the temperature should be sufficiently high to avoid solidification of the polymer but not so high as to vaporize the diluent employed. In the solution polymerization of ethylene, suitable temperatures range from about 120° to about 210° C. In particle form polymerization processes, wherein a suspension of solid, particulate polymer in an inert polymerization medium is formed, and in gas phase processes, wherein solid, particulate polymer is formed in the substantial absence of liquid polymerization medium, temperatures should be maintained at levels sufficiently low to avoid melting of the polymer in the polymerization zone but high enough to achieve reasonable polymerization rates. Preferred temperatures in the particle form polymerization of ethylene range from about 40° to about 110° C. In the gas phase polymerization of ethylene, temperatures preferably range from about 40° to about 130° C., and more preferably, from about 60° to about 120° C.

In solution or particle form processes, the liquid employed as the polymerization medium can be an alkane or cycloalkane such as butane, isobutane, pentane, hexane, heptane or cyclohexane, or a hydrogenated aromatic compound such as tetrahydronaphthalene or decahydronaphthalene, or a high molecular weight liquid paraffin or mixture of paraffins which are liquid at the polymerization temperature, or an aromatic hydrocarbon such as benzene, toluene or xylene or a halogenated aromatic compound such as chlorobenzene, chlornaphthalene or o-dichlorobenzene. The nature of the medium is subject to considerable variation, although the medium employed should be liquid under polymerization conditions and relatively inert. Other media which can be used include ethylbenzene, isopropylbenzene, ethyltoluene, n-propylbenzene, diethylbenzenes, mono- and dialkylnaphthalenes, n-octane, isooctane and methylcyclohexane. Preferably, a butane, pentane, or hexane is employed.

Irrespective of the type of polymerization process employed, polymerization typically is carried out in the presence of agents which act as chain terminators and thereby allow for control of polyalpha-olefin molecular weights. Most commonly, hydrogen is employed for this purpose. The amount of hydrogen to be employed will vary depending upon the molecular weight desired and can be determined by those skilled in the art based upon the examples appearing hereinafter.

Also irrespective of polymerization technique monomer pressures and total reactor pressures are maintained at levels sufficient to achieve reasonable polymerization rates. The latter generally range from about 100 to about 1000 psig. (7 to about 70 kg/cm$^2$), and more preferably, from about 200 to about 400 psig. (14 to about 30 kg/cm$^2$).

Polymerization time generally ranges from several minutes to several hours in batch processes. Contact times ranging from about 1 to about 4 hours are common when autoclave type reactors are employed. In continuous systems, wherein polymerization medium, if any, and excess monomer are recycled to a charging zone and additional catalyst and monomer introduced, contact times in the polymerization zone can be regulated as desired, and generally range from about ½ to several hours.

Polymerization in the presence of the invented catalysts is carried out in the substantial absence of oxygen, water, carbon dioxide, and other materials capable of adversely affecting catalyst activity. Typically, special steps need not be taken to exclude such materials from the polymerization zone due to the positive pressure exerted by the alpha-olefin to be polymerized. Purification of monomer and any diluent to be employed, such as by percolation through molecular sieves and/or silica gel, or through the use of excess promoter to scavenge impurities also is helpful in excluding catalyst poisons. In polymerization processes wherein the invented supported catalyst components are contacted with a deactivating agent to facilitate addition of the component to a polymerization zone in an alpha-olefin-containing flush stream, it may be desirable to use excess promoter to scavenge the deactivator and thereby ensure the attainment of high activities.

As a result of the above-described polymerization in the presence of the invented catalysts there are obtained polyalpha-olefins, having molecular weights typically ranging from about 50,000 to about 3,000,000, in sufficiently high yields, relative to the amount of catalyst employed, that useful polymeric products are obtained without the need for separation of catalyst residues. The polymers exhibit sufficiently broad molecular weight distributions as to be processable by a variety of techniques such as extrusion, mechanical melting, casting, and molding.

The following examples illustrate the present invention and are not to be construed as limiting the scope thereof.

EXAMPLE 1

Into a 500 ml, three-necked, round bottom flask equipped with mechanical stirrer, reflux condensor and nitrogen purge were added 34.9 g magnesium bis(trichloroacetate) (0.1 mole) followed by 13.6 ml tetrabutyl titanate (0.04 mole) and 10 ml nonane. The mixture was stirred and heated at the reflux temperature. After about 15 minutes the magnesium bis(trichloroacetate) dissolved and a yellow solution formed. Heating and stirring of the solution were continued for about 1¾ hours, after which the solution was allowed to cool to about 20° C. The solution then was diluted with 90 ml hexane, stirred, and 173.4 ml of a 50 wt.% solution of ethylaluminum dichloride in hexane (hereinafter 50% EADC; 173.4 ml contains 0.58 mole ethylaluminum dichloride) were added dropwise over a period of about 2⅓ hours during which a solid began to precipitate. Following completion of the addition of 50% EADC, the slurry was stirred overnight (about 16 hours). A 2 ml sample of the resulting slurry was removed and diluted with 52.7 ml hexane and aliquots thereof were employed according to Example 4. The halogen to metal atomic ratio for this catalyst component is calculated as follows: $[X]_a = 1.16$; $[X]_b = 0$; $2[M] = 0.2$; $m[M'] = 4 \times 0.04 = 0.16$; $([X]_a + [X]_b)/(2[M] + m[M']) = 1.16/0.36 = 3.2$.

EXAMPLE 2

(A) The procedure of Example 1 was repeated except that 100 ml hexane were added to the solution prior to addition of 50% EADC. Following addition of 50% EADC and stirring, solids were allowed to settle and 170 ml of supernatant were decanted and replaced with 170 ml hexane. A 2 ml sample of the resulting slurry was removed, diluted with 50.8 ml hexane, and aliquots thereof were employed according to Example 4.

(B) Following removal of the 2 ml sample in (A), the remainder of the slurry was transferred to a 500 ml round bottom flask equipped with mechanical stirrer and nitrogen purge. 4.75 g gaseous hydrogen chloride were passed through the slurry, with stirring, at 25° C. over approximately 1 hour. Thereafter a 2 ml sample of the result was removed, diluted with 50.8 ml hexane and aliquots thereof were employed according to Example 4.

EXAMPLE 3

The procedure of Example 1 was repeated except that 184.9 g magnesium bis(trichloroacetate) (0.53 mole), 72.1 ml tetrabutyl titanate (0.21 mole), 50 ml nonane, 400 ml hexane and 919 ml of 50 wt.% EADC (containing 3.1 mole ethylaluminum dichloride) were used. Following addition of 50% EADC and stirring, 720 ml of supernatant were decanted and replaced with 385 ml hexane. A 2 ml sample of the result was removed, diluted with 73 ml hexane, and aliquots thereof were employed according to Example 4.

EXAMPLE 4

A series of ethylene polymerizations was conducted according to the following procedure. 1 ml samples of the catalyst component slurries prepared in Examples 1-3 and 120 mg triethylammonium were stirred in about 250 ml hexane in a purged, 500 ml stainless steel autoclave reactor. Hydrogen was charged to the reactor as specified in TABLE I and sufficient ethylene was charged to develop a total pressure of 300 psig. During polymerization, ethylene was charged as needed to maintain a total reactor pressure of 300 psig. Polymerization was conducted at 85° C. over a period of 1 hour after which the reactor was opened and the contents filtered. The resulting solid polyethylene was dried overnight (about 16 hours) at 25° C. and then weighed. Melt indices were determined according to ASTM D1238 65T, Conditions E and F. For each run, hydrogen partial pressure, yield of solid polyethylene, catalyst activity, melt index (MI) according to ASTM D1238 65T, Condition E, and ratio ($MF_{10}/MF_1$) of melt index according to ASTM D1238 65T, Condition F to MI are reported in TABLE I.

TABLE I

| CATALYST COMPONENT | $H_2$ (psi) | YIELD (g) | ACTIVITY[1] | MI (dg/min) | $MF_{10}/MF_1$ |
|---|---|---|---|---|---|
| 1 | 80 | 41.5 | 20,750 | 0.62 | 38.4 |
| 1 | 80 | 45.4 | 22,700 | 0.64 | 43.9 |
| 1 | 100 | 27.7 | 13,850 | 1.3 | 38.0 |
| 2A | 80 | 31.4 | 15,700 | 0.34 | 43.8 |
| 2A | 100 | 31.4 | 15,700 | 1.0 | 43.4 |
| 2B | 80 | 14.0 | 7,000 | 0.60[2] | ND[3] |
| 2B | 80 | 13.3 | 6,600 | 0.65[2] | ND |
| 2B[4] | 100 | 26.0 | 6,500 | 1.3 | 43.8 |
| 3 | 80 | 61.2 | 30,600 | 0.23 | 43.0 |
| 3 | 100 | 54.2 | 27,200 | 0.57 | 40.0 |
| 3 | 80 | 58.7 | 29,350 | 0.28 | 41.4 |
| 3 | 100 | 53.7 | 26,850 | 0.82 | 38.4 |

[1] g polyethylene per g catalyst component (calculated as equivalent amount of titanium trichloride and magnesium dichloride) per hour.
[2] MI in these runs were determined according to a variant of ASTM D1258 65T Condition E wherein a nonstandardized preheat was used.
[3] ND stands for not determined.
[4] 2 ml catalyst component slurry were used in this run.

Examples 1–4 and TABLE I illustrate preparation of the invented catalyst components and catalysts and the performance thereof in the polymerization of ethylene. As shown in the table, activities in all runs exceeded those typically required to eliminate the need for separation of catalyst residues from the product (about 5,000 g/g/hour). Further, the catalysts were sensitive to hydrogen as indicated by variations in MI with varying hydrogen partial pressures. In addition, it can be seen that product molecular weight distributions, as evidenced by $MF_{10}/MF_1$, were sufficiently broad to ensure ease of processing.

Example 2B illustrates deactivation treatment of the catalyst component of Example 2A with hydrogen chloride. The deactivation was reversible as evidenced by the activities reported in TABLE I. As compared to the catalyst component of Example 2A, the deactivation treated-component was less active, however, hydrogen sensitivity increased.

EXAMPLE 5

(A) The procedure of Example 1 was repeated except that 3.49 g (0.01 mole) magnesium bis(trichloroacetate), 1.14 ml tetrabutyl titanate (0.004 mole), 20 ml nonane, 50 ml hexane and 16 ml 50% EADC (containing 0.05 mole ethylaluminum dichloride) were used. Following addition of the latter and stirring, 43 ml of supernatant were removed and replaced with 23 ml hexane. A 4 ml sample of the result was removed, diluted with 46 ml hexane, and aliquots thereof were employed according to Example 7.

(B) A 25 ml sample of the suspension of catalyst component remaining after removal of the 4 ml sample in (A) was removed and 2 ml distilled water were added thereto to decompose the catalyst component. The result then was dried in an oven at 100° C. under vacuum of 20 inches Hg. Analysis of the result for magnesium, titanium and aluminum by atomic absorption showed 3.1 wt.% magnesium, 3.19 wt.% titanium and 16.6 wt.% aluminum.

(C) The catalyst suspension remaining after removal of the 25 ml sample in (B) was allowed to settle, supernatant was decanted and the solid catalyst component was washed three times with 100 ml portions of hexane. The washed catalyst component then was dried at 100° C. under vacuum of 20 inches Hg and then analyzed for magnesium, titanium and aluminum by atomic absorption and for chlorine by X-ray florescence. The analyses showed 6.0 wt.% magnesium, 6.0 wt.% titanium, 10.1 wt.% aluminum and 33.5 wt.% chlorine.

EXAMPLE 6

(A) For purposes of comparison, a catalyst component was prepared as follows. Into a 300 ml round bottom flask equipped with reflux condenser, mechanical stirrer and nitrogen purge were added 3.49 g (0.01 mole) magnesium bisS(trichloroacetate), 0.44 ml (0.004 mole) titanium tetrachloride and 86 ml nonane. This mixture was heated at the reflux temperature and stirred for a period of 2 hours. Subsequently, the contents of the flask were cooled to about 25° C. over a period of 2 hours, the clear supernatant was decanted and 23 ml hexane were added. A 43 ml sample of the resulting slurry was removed and diluted with 46 ml hexane. Aliquots of this suspension were employed according to Example 7.

(B) A 25 ml sample of the suspension remaining after removal of the 43 ml sample in (A) was removed, air-dried for 16 hours and then dried in an oven at 100° C. under vacuum of 20 inches Hg for 16 hours. Analysis of the resulting solid by atomic absorption showed 4.3 wt.% magnesium, 6.49 wt.% titanium and 0 wt.% aluminum.

(C) The suspension of catalyst component remaining after removal of the 25 ml sample in (B) was allowed to settle, supernatant was decanted and the solid was washed three times with 100 ml portions of hexane. Subsequently, the washed solid was suspended in 40 ml hexane and a 10 ml sample of the result was removed and diluted with 40 ml hexane. Aliquots of this suspension were employed according to Example 7.

(D) Supernatant was removed from the suspension remaining after removal of the 10 ml sample in (C) and the solid was dried in an oven at 100° C. under vacuum of 20 inches Hg for 16 hours. Analysis of the result by atomic absorption and X-ray florescence showed 4.7 wt.% magnesium, 5.7 wt.% titanium, 0 wt.% aluminum, and 9.7 wt.% chlorine.

EXAMPLE 7

A series of ethylene polymerization runs was conducted using the catalyst components prepared in Examples 5(A), 6(A) and 6(C) according to the procedure of Example 4. Results are reported in TABLE II.

TABLE II

| CATALYST COMPONENT | $H_2$ (psi) | YIELD (g) | ACTIVITY (1) | MI (dg/min) |
|---|---|---|---|---|
| 5(A) | 80 | 38.3 | 19,150 | 3.18 |
| 6(A) | 80 | 0.2 | 100 | (2) |
| 6(C) | 80 | 0.1 | 50 | (2) |

TABLE II-continued

| CATALYST COMPONENT | H₂ (psi) | YIELD (g) | ACTIVITY (1) | MI (dg/min) |
|---|---|---|---|---|
| 6(C) (3) | 80 | 0.8 | 100 | (2) |

(1) g polyethylene per g catalyst component (calculated as equivalent amount of titanium trichloride and magnesium dichloride) per hour.
(2) Yield was too low to determine MI.
(3) 4 ml catalyst component slurry were used in this run.

Examples 5 and 7 and TABLE II illustrate additional catalyst component preparations and polymerizations. Example 6 illustrates a preparation according to the general procedure of the Boone et al. patent discussed hereinabove except that titanium tetrachloride and magnesium bis(trichloroacetate) were used in amounts corresponding to the titanium/magnesium atomic ratio in Example 5 and catalyst component 6(A) was not washed prior to polymerization use.

As can be seen from TABLE II, catalysts containing components 6(A) and (C) exhibited insignificant activities as compared to the catalyst containing 5(A). These results are consistent with the elemental analyses of components prepared in Examples 5 and 6 which show similarities in titanium and magnesium levels but substantial differences in chlorine and aluminum levels. The poor activities of 6(A) and (C) can be attributed to the fact that the amount of chlorine available in Example 6 was insufficient to chloride both the magnesium and titanium employed. Replacement of the magnesium trichloroacetate employed in Example 6 with a magnesium trichloroacetate-aluminum halide reaction product such as that described by Boone et al. at Column 2 lines 1–55 results in catalyst components containing more chlorine and aluminum than components 6(A) and (C); however, the use of an aluminum halide according to Boone et al. does not result in reduction of Group IVB or VB metal as does the use of organoaluminum components according to the present invention. Accordingly, the composition of the invented catalyst components differs from that of Boone et al.'s catalyst components whether or not an aluminum halide is employed according to the latter.

EXAMPLE 8

Into a 2 liter round bottom, three necked flask under nitrogen were added 184.9 g (0.53 mole) magnesium bis(trichloroacetate), 50 ml nonane and 72.1 ml (0.21 mole) tetrabutyl titanate. This mixture was heated to the reflux temperature until the magnesium bis(trichloroacetate) substantially dissolved and then allowed to cool. 300 ml hexane then were added to the yellow solution and the result was again heated to the reflux temperature. The flask then was placed in a room temperature water bath and dropwise addition of 50% EADC was begun. After 1 hour, 140 ml of 50% EADC had been added and the mixture became thick and difficult to stir. 100 ml hexane were added to dilute the mixture and then addition of 50% EADC was resumed. A total of 919 ml 50% EADC (containing 3.18 moles ethylaluminum dichloride) was added over a total of 3½ hours. During addition of 50% EADC, the mixture in the flask took on a green color, but on completion of the addition a dark brown solid was observed and the supernatant was dark and opaque. The contents of the flask were stirred for about 16 hours after completion of the 50% EADC addition.

Approximately 1 month after preparation of the solid catalyst component, the same was promoted with triethylaluminum and used to polymerize ethylene in a 95 gallon tubular reactor. Polymerization was conducted in isobutane at 210° F., and 610 psig using about 0.04 mole hydrogen per mole of ethylene. Catalyst fed poorly during the run due to the presence of large, light tan flakes which formed during storage or handling of the catalyst component. Due to the feeding problems, polymerization was terminated after 7 hours.

In view of the dark brown color of the catalyst component as prepared, it appears that the tan flakes formed due to exposure of the component to oxygen during storage or handling. The change in color from dark brown to light tan is consistent with oxidation of lower valent titanium to titanium(IV).

We claim:

1. A catalyst component comprising the reaction product of components comprising:
  (1) at least one divalent Group IIA, IIB, IVA, VIB, VIIB or VIII metal bis(halocarboxylate) prepared by reaction of at least one divalent metal or divalent metal oxide, hydroxide or carbonate with at least one halocarboxylic acid and drying the resulting divalent metal bis(halocarboxylate),
  (2) at least one oxygenated organic compound of a Group IVB or VB metal corresponding to the formula $M^1(OR^1)_m$ or $O=M^1(OR^1)_{m-2}$ wherein $M^1$ is a Group IVB or VB metal, each $R^1$ is independently an organic radical and m corresponds to the valence of $M^1$,
  (3) at least one organoaluminum component of the formula $AlR^2_nX_{3-n}$ wherein each $R^2$ is independently a hydrocarbyl radical, X is halogen, and $0<n\leq3$ said components being reacted in amounts such that the atomic ratio of metal in (2) to metal in (1) ranges from about 0.05:1 to about 20:1 and the atomic ratio of aluminum in (3) to metal in (2) ranges from about 5:1 to about 50:1, with the proviso that when (3), contains less than an amount of halogen which is effective to halide the metal in (1) and (2), said components comprise, in addition to (1), (2) and (3), a component (4) which is at least one halogenating agent other than a Group IVB-VIB metal halide in an amount such that (3) and (4) contain at least an effective amount of halogen; said reaction being conducted at about 0° to about 200° C. in the substantial absence of extraneous catalyst poisons and comprising contacting components (2) and (3) in the presence of component (1).

2. The catalyst component of claim 1 wherein (1) comprises a material containing the structure

wherein M is magnesium or manganese(II), and R is a mono- or polychlorinated or -brominated alkyl of 1 to about 20 carbon atoms or aryl, alkaryl or aralkyl of 6 to about 20 carbon atoms.

3. The catalyst component of claim 1 wherein (2) comprises a material of the formula $M^1(OR^1)_m$ or $O=M^1(OR^1)_{m-2}$ wherein $M^1$ is titanium (IV), zirconium (IV) or vanadium(III), (IV) or (V), each $R^1$ is independently an organic radical of 1 to about 20 carbon atoms and m corresponds to the valence of $M^1$.

4. The catalyst component of claim 1 wherein (4) comprises at least one halogenating agent selected from the group consisting of molecular halogens, hydrogen halides, halogenated organics containing reactive halogen, nonmetallic halides and oxyhalides and metallic halides.

5. The catalyst component of claim 1 wherein (3) comprises a material of the formula $AlR^2_nX_{3-n}$ wherein each $R^2$ is independently a hydrocarbyl radical of 1 to about 20 carbon atoms, X is chlorine or bromine and $0<n<3$.

6. The catalyst component of claim 5 wherein (1) comprises a magnesium or manganous salt of a $C_{2-8}$ alkanoic acid or benzoic acid having at least one chlorine or bromine atom alpha to the carbonyl carbon.

7. The catalyst component of claim 6 wherein (2) comprises titanium(IV) alkoxide or a combination of titanium(IV) alkoxide with zirconium(IV) or vanadium-(III), (IV) or (V) alkoxide or oxoalkoxide, each of said alkoxide groups containing 1 to about 6 carbon atoms.

8. The catalyst component of claim 7 wherein (3) comprises a material of the formula $AlR^2_nX_{3-n}$ wherein each $R^2$ is independently a straight chain, branched or cyclic alkyl of 1 to about 8 carbon atoms, X is chlorine and $0.5<n<2$.

9. The catalyst component of claim 1 further characterized in that said component is contacted with an agent capable of temporarily and reversibly deactivating said component.

10. The catalyst component of claim 9 wherein said agent is a lower aliphatic alcohol or anhydrous hydrogen halide.

11. A catalyst component comprising the reaction product of components comprising:
  (1) magnesium bis(trichloroacetate) prepared by refluxing magnesium oxide, hydroxide or carbonate with trichloroacetic acid and drying the resulting magnesium bis(trichloroacetate);
  (2) tetrabutyl titanate in an amount containing about 0.1 to about 10 atoms of titanium per atom of magnesium in (1); and
  (3) ethylaluminum dichloride in an amount such that the atomic ratio of aluminum to titanium in (2) ranges from about 5:1 to about 50:1, said amount containing at least an amount of chlorine which is effective to chloride the magnesium in (1) and titanium in (2),
said reaction being conducted in the substantial absence of extraneous catalyst poisons and comprising reacting (1) and (2) at about 80 to about 160° C. for about ¼ to about 5 hours, combining (3) with the product of (1) and (2) over a period of about ½ to about 5 hours and then reacting such materials at about 0° to about 85° C. for about 1 to about 20 hours.

12. The catalyst component of claim 11 further characterized in that said component is contacted with an agent capable of temporarily and reversibly deactivating said component.

13. The catalyst component of claim 12 wherein said agent is anhydrous hydrogen chloride or ethanol.

14. A catalyst composition comprising (A) a promoter comprising at least one Group IA, IIA, IIB, IIIA or IVA organo-metallic having at least one hydrocarbyl group bonded to metal, said promoter being present in at least an amount which is effective to promote the activity of (B); and (B) a supported component which is the reaction product of components comprising:
  (1) at least one divalent Group IIA, IIB, IVA, VIB, VIIB or VIII metal bis(halocarboxylate) prepared by reaction of at least one divalent metal or divalent metal oxide, hydroxide, or carbonate with at least one halocarboxylic acid and drying the resulting divalent metal bis(halocarboxylate),
  (2) at least one oxygenated organic compound of a Group IVB or VB metal corresponding to the formula $M^1(OR^1)_m$ or $O=M^1(OR^1)_{m-2}$ wherein $M^1$ is a Group IVB or VB metal, each $R^1$ is independently an organic radical, and m corresponds to the valence of $M^1$,
  (3) at least one organoaluminum component of the formula $AlR^2_nX_{3-n}$ wherein each $R^2$ is independently a hydrocarbyl radical, X is halogen, and $0<n\leq3$ said components being reacted in amounts such that the atomic ratio of metal in (2) to metal in (1) ranges from about 0.05:1 to about 20:1 and the atomic ratio of aluminum in (3) to metal in (2) ranges from about 5:1 to about 50:1, with the proviso that when (3) contains less than an amount of halogen which is effective to halide the metal in (1) and (2), said components comprise, in addition to (1), (2) and (3), a component (4) which is at least one halogenating agent other than a Group IVB-VIB metal halide in an amount such that (3) and (4) contain at least an effective amount of halogen, said reaction being conducted at about 0° to 200° C. in the substantial absence of extraneous catalyst poisons and comprising contacting components (2) and (3) in the presence of component (1).

15. The catalyst of claim 14 wherein (A) comprises a Group IIIA trialkyl or dialkylhydride containing 1 to about 20 carbon atoms per alkyl radical.

16. The catalyst of claim 15 wherein (1) comprises a magnesium or manganous salt of a $C_{2-8}$ alkanoic acid or benzoic acid having at least one chlorine or bromine atom alpha to the carbonyl carbon.

17. The catalyst of claim 16 wherein (2) comprises titanium(IV) alkoxide or a combination of titanium(IV) alkoxide with zirconium(IV) or vanadium(III), (IV) or (V) alkoxide or oxoalkoxide, each of said alkoxide groups containing 1 to about 6 carbon atoms.

18. The catalyst of claim 17 wherein (3) comprises a material of the formula $AlR^2_nX_{3-n}$ wherein each $R^2$ is independently a straight chain, branched or cyclic alkyl of 1 to about 8 carbon atoms, X is chlorine and $0.5\leq n\leq2$.

19. The catalyst of claim 18 wherein (A) comprises a trialkylaluminum having 1 to about 6 carbon atoms per alkyl radical.

20. The catalyst of claim 19 wherein (A) comprises triethylaluminum or triisobutylaluminum.

21. The catalyst of claim 20 further characterized in that (B) is contacted with an agent capable of temporarily and reversibly deactivating said component.

22. The catalyst of claim 21 wherein said agent is anhydrous hydrogen chloride or ethanol.

23. A catalyst composition comprising (A) triethylaluminum in amount which is at least effective to promote the activity of (B); and (B) a supported component comprising the reaction product of components comprising:
  (1) magnesium bis(trichloroacetate) prepared by refluxing magnesium oxide, hydroxide or carbonate with trichloroacetic acid and drying the resulting magnesium bis(trichloroacetate);
  (2) tetrabutyl titanate in an amount containing about 0.1 to about 10 atoms of titanium per atom of magnesium in (1); and
  (3) ethylaluminum dichloride in an amount such that the atomic ratio of aluminum to titanium in (2)

ranges from about 5:1 to about 50:1, said amount containing at least an amount of chlorine which is effective to chloride the magnesium in (1) and titanium in (2);

said reaction being conducted in the substantial absence of extraneous catalyst poisons and comprising reacting (1) and (2) at about 80° to about 160° C. for about ⅔ to about 5 hours, combining (3) with the product of (1) and (2) over a period of about ½ to about 5 hours and then reacting such materials at about 0° to about 85° C. for about 1 to about 20 hours.

24. The catalyst of claim 23 further characterized in that (B) is contacted with an agent capable of temporarily and reversibly deactivating said component.

25. The catalyst of claim 24 wherein said agent is anhydrous hydrogen chloride or ethanol.

26. A method for preparing a catalyst component comprising reacting, in the substantial absence of catalyst poisons, components comprising:
  (1) at least one divalent Group IIA, IIB, IVA, VIB, VIIB or VIII metal bis(halocarboxylate) prepared by reaction of at least one divalent metal or divalent metal oxide, hydroxide or carbonate with at least one halocarboxylic acid and drying the resulting divalent metal bis(halocarboxylate),
  (2) at least one oxygenated organic compound of a Group IVB or VB metal corresponding to the formula $M^1(OR^1)_m$ or $O=M^1(OR^1)_{m-2}$ wherein $M^1$ is a Group IVB or VB metal, each $R^1$ is independently an organic radical and m corresponds to the valence of $M^1$,
  (3) at least one organoaluminum component of the formula $AlR^2{}_nX_{3-n}$ wherein each $R^2$ is independently a hydrocarbyl radical, X is halogen, and $0 < n \leq 3$ said components being reacted in amounts such that the atomic ratio of metal in (2) to metal in (1) ranges from about 0.05:1 to about 20:1 and the atomic ratio of aluminum in (3) to metal in (2) ranges from about 5:1 to about 50:1, with the proviso that when (3) contains less than an amount of halogen which is effective to halide the metal in (1) and (2), said components comprise, in addition to (1), (2) and (3), a component (4) which is at least one halogenating agent other than a Group IVB-VIB metal halide in an amount such that (3) and (4) contain at least an effective amount of halogen; said reaction being conducted at about 0° to about 200° C. and comprising contacting components (2) and (3) in the presence of component (1).

27. The method of claim 26 wherein (1) comprises a magnesium or manganous salt of a $C_{2-8}$ alkanoic acid or benzoic acid having at least one chlorine or bromine atom alpha to the carbonyl carbon.

28. The method of claim 27 wherein (2) comprises titanium(IV) alkoxide or a combination of titanium(IV) alkoxide with zirconium(IV) or vanadium(III), (IV) or (V) alkoxide or oxoalkoxide, each of said alkoxide groups containing 1 to about 6 carbon atoms.

29. The method of claim 28 wherein (3) comprises a material of the formula $AlR^2{}_nX_{3-n}$ wherein each $R^2$ is independently a straight chain, branched or cyclic alkyl of 1 to about 8 carbon atoms, X is chlorine and $0.5 \leq n \leq 2$.

30. The method of claim 29 wherein said reaction is conducted in the presence of an inert liquid hydrocarbon or halogenated hydrocarbon diluent.

31. The method of claim 30 wherein components (1) and (2) are reacted in the presence of said diluent to form a one-phase system.

32. The method of claim 29 further characterized in that said catalyst component is temporarily and reversibly deactivated with anhydrous hydrogen chloride or ethanol.

33. The method of claim 32 further characterized in that said temporarily and reversibly deactivated catalyst component is combined with a trialkylaluminum having 1 to about 6 carbon atoms per alkyl radical in an amount which is at least effective to promote the activity of said catalyst component.

34. The method of claim 29 further characterized in that said catalyst component is combined with a trialkylaluminum having 1 to about 6 carbon atoms per alkyl radical in an amount which is at least effective to promote the activity of said catalyst component.

35. The method of claim 34 wherein said catalyst component is combined with said trialkylaluminum in the presence of alpha-olefin monomer.

36. The method of claim 26 further characterized in that said catalyst component is contacted with an agent capable of temporarily and reversibly deactivating said component.

37. The method of claim 36 wherein said deactivating agent is anhydrous hydrogen chloride or ethanol.

38. The method of claim 26 further characterized in that said catalyst component is combined with a promoter comprising at least one Group IA, IIA, IIB, IIIA or IVA organometallic having at least one hydrocarbyl group bonded to metal in an amount which is at least effective to promote the activity of said catalyst component.

39. The method of claim 38 wherein said promoter comprises a trialkylaluminum containing 1 to about 6 carbon atoms per alkyl radical.

40. The method of claim 39 wherein said catalyst component is combined with said trialkylaluminum in the presence of alpha-olefin monomer.

41. The method of claim 26 further characterized in that said catalyst component is contacted with an agent capable of temporarily and reversibly deactivating said component and said temporarily and reversibly deactivated component is combined with a promoter comprising at least one Group IA, IIA, IIB, IIIA or IVA organometallic having at least one hydrocarbyl group bonded to metal in an amount which is at least effective to promote the activity of said catalyst component.

42. The method of claim 41 wherein said promoter is a trialkylaluminum containing 1 to about 6 carbons per alkyl radical.

43. The method of claim 42 wherein said catalyst component is combined with said trialkylaluminum in the presence of alpha-olefin monomer.

44. The method of claim 43 wherein said agent is anhydrous hydrogen chloride or ethanol.

45. A method for preparing a catalyst component comprising:
  (A) reacting (1) magnesium bis(trichloroacetate) prepared by refluxing magnesium oxide, hydroxide or carbonate and trichloroacetic acid and drying the resulting magnesium bis(trichloroacetate) and (2) tetrabutyl titanate in an amount containing 0.1 to about 10 atoms titanium per atom of magnesium at about 80° to about 160° C.; and
  (B) reacting the product from (A) with ethylaluminum dichloride in an amount such that the atomic ratio of aluminum to titanium ranges from about 5:1 to about 50:1, said amount containing at least an amount of chlorine which is effective to chloride the magnesium and titanium in said product from (A); said reaction being conducted at about 0° to about 85° C.;

said steps (A) and (B) being conducted in an inert liquid hydrocarbon or halogenated hydrocarbon diluent and in the substantial absence of extraneous catalyst poisons.

46. The method of claim 45 further characterized in that said catalyst component is temporarily and reversibly deactivated with anhydrous hydrogen chloride or ethanol.

47. The method of claim 46 further characterized in that said temporarily and reversibly deactivated catalyst component is combined with an amount of triethylaluminum which is at least effective to promote the activity of said catalyst component.

48. The method of claim 47 wherein said temporarily and reversibly deactivated catalyst component is combined with said triethylaluminum in the presence of ethylene.

49. The method of claim 45 further characterized in that said catalyst component is combined with an amount of triethylaluminum which is at least effective to promote the activity of said catalyst component.

50. The method of claim 49 wherein said catalyst component is combined with said triethylaluminum in the presence of ethylene.

* * * * *

UNITED STATES PATENT AND TRADEMARK OFFICE
CERTIFICATE OF CORRECTION

PATENT NO. : 4,313,850                                              Page 1 of 2

DATED : February 2, 1982

INVENTOR(S) : Nicholas K. Kildahl and Peter Fotis

It is certified that error appears in the above-identified patent and that said Letters Patent is hereby corrected as shown below:

PATENT

| Col. | Line | | |
|---|---|---|---|
| 1 | 33 | "of Column" should be | --at Column-- |
| 2 | 30 | "monoor" should be | --mono or-- |
| 4 | 20,21,22 | "monobromop-" should be | --monobromo- -- |
| 4 | 21,22,23 | "suedocumolcarboxylate" should be | --psuedocumolcarboxylate-- |
| 4 | 33 | "inverted" should be | --invented-- |
| 4 | 57 | "valence of M'" should be | --valence of $M^1$-- |
| 6 | 63 | "$\overset{\sim}{\geq}1$" should be | -- $\overset{\sim}{\geq}1$ -- |
| 7 | 12 | "$\overset{\sim}{\geq}2[M]$" should be | -- $\overset{\sim}{\geq}2[M]$ -- |
| 12 | 66 | "triethylammonium" should be | --triethylaluminum-- |
| 14 | 24 | "bisS(trichloroacetate)" should be | --bis(trichloroacetate)-- |

UNITED STATES PATENT AND TRADEMARK OFFICE
CERTIFICATE OF CORRECTION

PATENT NO. : 4,313,850

DATED : February 2, 1982

INVENTOR(S) : Nicholas K. Kildahl and Peter Fotis

It is certified that error appears in the above-identified patent and that said Letters Patent is hereby corrected as shown below:

Patent

| Col | Line | |
|---|---|---|
| 17 | 60 | "organo-metallic" should be --organometallic-- |
| 19 | 7 | "about 2/3" should be --about 1/4-- |

Signed and Sealed this

Eighth Day of February 1983

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,313,850
DATED : February 2, 1982
INVENTOR(S) : Nicholas K. Kildahl et al.

It is certified that error appears in the above-identified patent and that said Letters Patent is hereby corrected as shown below:

Column 17, line 22, "$0.5<n<2$" should read -- $0.5 \leq n \leq 2$ --.

Signed and Sealed this

Twelfth Day of April 1983

[SEAL]

Attest:

GERALD J. MOSSINGHOFF

Attesting Officer     Commissioner of Patents and Trademarks